(12) United States Patent
Vacanti

(10) Patent No.: US 7,839,936 B2
(45) Date of Patent: Nov. 23, 2010

(54) METHOD AND SYSTEM FOR DETERMINING A NUMBER OF DATA PACKETS REQUIRED TO TRANSPORT A DATA BLOCK

(75) Inventor: Michael Vacanti, Roseville, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1602 days.

(21) Appl. No.: 11/123,483

(22) Filed: May 5, 2005

(65) Prior Publication Data

US 2006/0251121 A1 Nov. 9, 2006

(51) Int. Cl.
*H04N 7/18* (2006.01)
(52) U.S. Cl. .............................. 375/240.26; 375/240.01
(58) Field of Classification Search .................. 375/240.01–240.29
See application file for complete search history.

(56) References Cited

U.S. PATENT DOCUMENTS 6,597,660 B1 * 7/2003 Rueda et al. ............. 370/230.1
7,590,145 B2 * 9/2009 Futch et al. ................. 370/466

* cited by examiner

*Primary Examiner*—Andy S Rao

(57) ABSTRACT

A method and system for determining a number of non-power of two sized data packets required to transport a data block. A data block size is shifted rightward by a number of bits equal to a base-two exponent of a divisor, with the bits remaining stored as a first value, and the bits removed stored as a second value. At least one binary shift is performed to calculate a third and fourth value. The fourth value is shifted and added to the second value to calculate a fifth value. At least one comparison is performed on the fifth value to process a sixth and seventh value. A number of non-power of two sized data packets is determined by summing the first, third, and sixth values, then adding one if the seventh value is not zero.

19 Claims, 6 Drawing Sheets

METHOD AND SYSTEM FOR DETERMINING A NUMBER OF DATA PACKETS REQUIRED TO TRANSPORT A DATA BLOCK

TECHNICAL FIELD

Embodiments of the present invention relate to methods and systems for data packet transmission, division of data blocks into data packets, and computerized division by non-power of two numbers.

BACKGROUND ART

Modern day computing depends on moving data from place to place. This is true of Internet connected applications, local network applications, and applications co-located on the same computer. It is also true of computing processes on a board within a computer, and it is even true within processors and computer chips within a computer. To get things done, information must be moved, or routed from place to place.

Data is often moved in chunks. A big chunk of data is often called a block. Sometimes systems and applications cannot handle a block of data all at once, or else cannot handle it efficiently. In these situations, the data blocks are broken into smaller chunks for transmission and reassembly after receipt. These smaller chunks are often called packets. A large portion of the information in a packet is the piece that represents part of the data from the data block. A small portion of the information in the packet is for overhead, such as for error correcting information or for delivery routing information. When the packet is assembled, a piece of data is broken off the data block and then combined overhead to form a packet for transmission. The process is reversed upon receipt of the packets. That is, the overhead portions are removed, and the actual data portions of the packets are reassembled into a data block.

Many transmission systems transmit packets in power of two sizes, for instance, 32 byte, 64 byte, or 128 byte packets. Because some small portion of the packet is overhead, and some large portion is a piece from the data block, this means that the actual data part of the packet is almost always a non-power of two size such as 31 bytes, 62 bytes, or 124 bytes. The reason power of two sized data packets are prevalent is that digital data, which is composed of ones and zeros, is governed by principles of base-two or binary numbering. Looking at some simple binary numbers and their decimal equivalents, such as 00001=1, 00010=2, 00100=4, 01000=8, 10000=16, makes it apparent that every time a bit is added to the length of a binary number, its size doubles or increases by a power of two. Similarly, packet transmission sizes are also governed by power of two.

Because the data portion of these packets is a non-power of two size, the large data block will have to be divided into many of these non-power of two sized parcels of data that will be assembled into packets for transmission. Computers are good at dividing and adding, but in order to route packets as fast as possible, especially on the chip level, logic and processes have to be optimized to meet circuit timing requirements. This can be difficult when division by a non-power of two sized number is required, because it requires lots of adding, which eats up time in the process.

Therefore, a method and/or system that can facilitate the process of breaking a data block into non-power of two sized chunks would be of great value. A method and/or system that could do this and improve timing in methods and/or systems would also be valuable. Embodiments of the present invention provide these advantages.

DISCLOSURE OF THE INVENTION

Methods and systems for determining a number of non-power of two sized data packets required to transport a data block are described. A data block size is shifted rightward by a number of bits equal to a base-two exponent of a divisor, with the bits remaining stored as a first value, and the bits removed stored as a second value. At least one binary shift is performed to calculate a third and fourth value. The fourth value is shifted and added to the second value to calculate a fifth value. At least one comparison is performed on the fifth value to process a sixth and seventh value. A number of non-power of two sized data packets is determined by summing the first, third, and sixth values, then adding one if the seventh value is not zero.

BRIEF DESCRIPTION OF THE DRAWINGS

The accompanying drawings, which are incorporated in and form a part of this specification, illustrate embodiments of the invention and, together with the description, serve to explain the principles of the invention.

Figure 1:
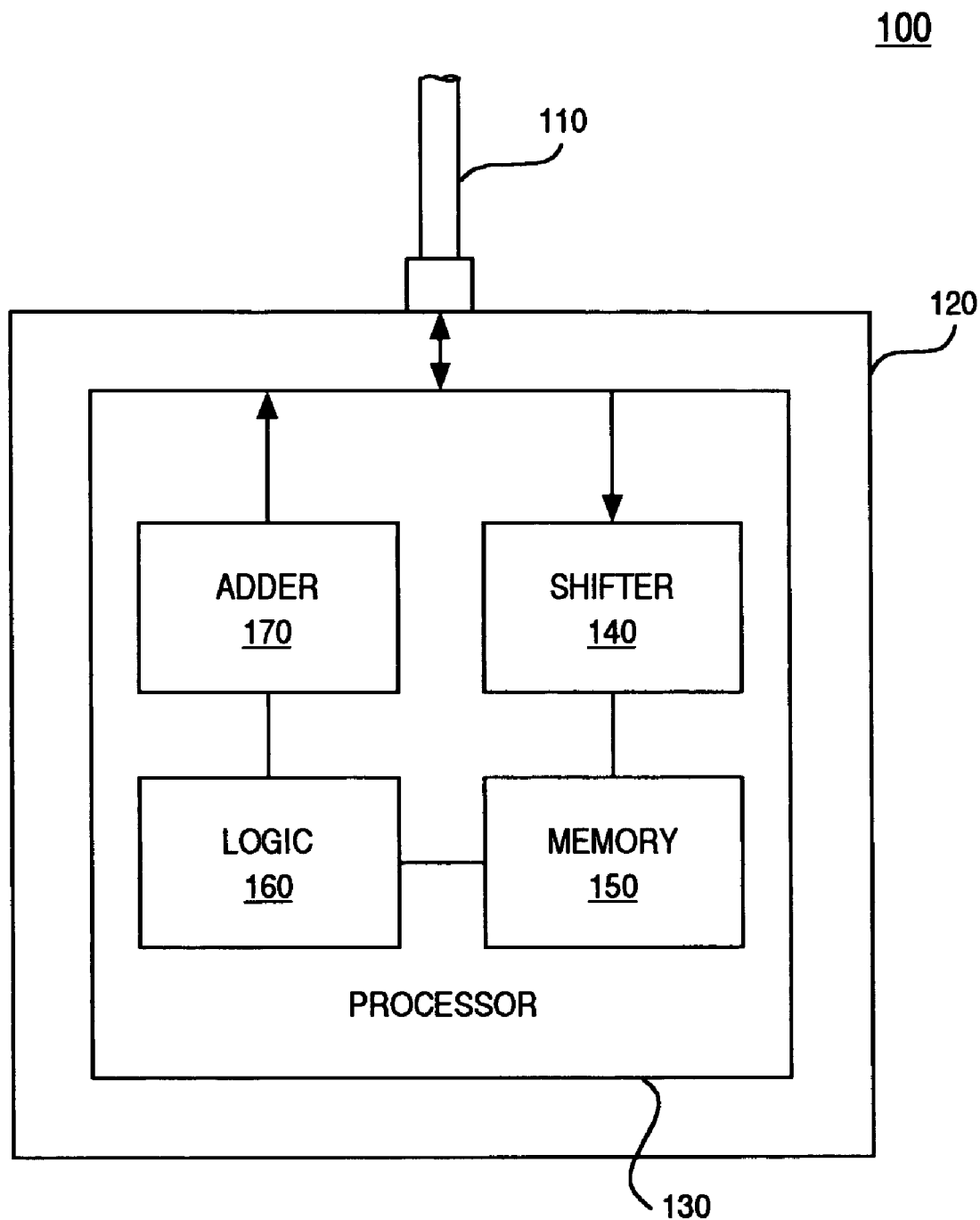
FIG. 1 is a block diagram of a computer system containing a processor capable of processing data according to embodiments of the present invention.

The drawings referred to in this description should not be understood as being drawn to scale except if specifically noted.

BEST MODE FOR CARRYING OUT THE INVENTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

The discussion will be begin with a description of computer systems that utilize processors capable of executing a process to determine the number of non-power of two data packets required to transport a data block, in accordance with embodiments of the present invention. During this discussion, different embodiments of systems will be described, and the composition of a data packet will be explained at a very high level in order to facilitate a better understanding of the process that the processors are cabable of executing. The discussion will then move on to describe embodiments of a method for determining the number of non-power sized data packets needed to transport a data block. This will be done utilizing data flow diagrams and flowcharts of some embodiments of the method.

A large part of the usefulness of the embodiments of the present invention is the ability to accomplish a task with improved circuit timing. Put another way, it takes fewer clock cycles for the systems and methods described below to accomplish the actions they are performing, as compared to the time it would take with traditional means. While the systems and methods described in the embodiments for determining the number of non-power of two data packets required to transport a data block may seem complex to a human, they are easy for a computer to execute. Further, the systems and methods described in the embodiments have distinct advantages over simply dividing a data block by a non-power of two number. One of the advantages is that the process described in these embodiments only divides by power of two sized numbers, which take very few actions or clock cycles for a computer to accomplish in comparison to dividing by non-power of two sized numbers. Another advantage is that very few addition steps and subtraction steps are required, and those that are required are very simple. Though processors are adept at performing arithmetic operations such as addition and subtraction, these operations eat up clock cycles and make it hard to meet timing, especially in high-speed hardware implementations. The systems and methods described in the embodiments reduce the arithmetic operations required to just a few simple, low clock cycle, low logic requirement calculations. The systems and methods described in the embodiments also utilize several comparison steps and data shifting steps, but these steps are also simple to do quickly, and thus assist in improving timing within chip architecture.

FIG. 1 shows a block diagram of a computer system 100 comprising a communications link 110, a computer 120, and a processor 130 which is capable of executing a process to determine a number of non-power of two sized data packets required to transport a data block, according to embodiments of the present invention. In some embodiments, the non-power of two data packets each comprise sixty-two bytes. In the embodiment shown, there is only one communications link 110; in other embodiments there can be a plurality of communications links. In some embodiments, the processor 130 comprises an Application Specific Integrated Circuit (ASIC). The processor 130 is capable of routing data to and from applications within the computer 100, and to and from devices connected to the computer via the communications link 110.

The computer 120 contains a processor 130 capable of executing a process to determine a number of non-power of two sized data packets required to transport a data block. The processor 130 comprises a shifter 140 to shift a data block size by a number of bits. In one embodiment the shifter 140 can shift a data block size by a number of bits equal to a base-two exponent of a divisor, wherein the divisor is greater than the non-power of two sized data packet by a power of two. The processor 130 also comprises a memory 140 to store a first value of bits remaining, and a second value of bits removed by the shifter. The memory can also store instructions to be executed. The processor 130 also comprises logic 160 to compute a plurality of partial results and a remainder from the first value and the second value. In some embodiments, the logic 160 also comprises logic to compute a third value and a fourth value from said first value with a looping comparator. In some embodiments, the logic 160 also comprises logic to compute the remainder and a sixth value with a priority encoder. The processor also comprises an adder 170 for adding, wherein the adder determines a number of non-power of two data packets, such that said non-power of two data packets are sent over the communications link 110. In some embodiments, the adder 170 also comprises a priority encoder to accomplish conditional adding.

Figure 2:
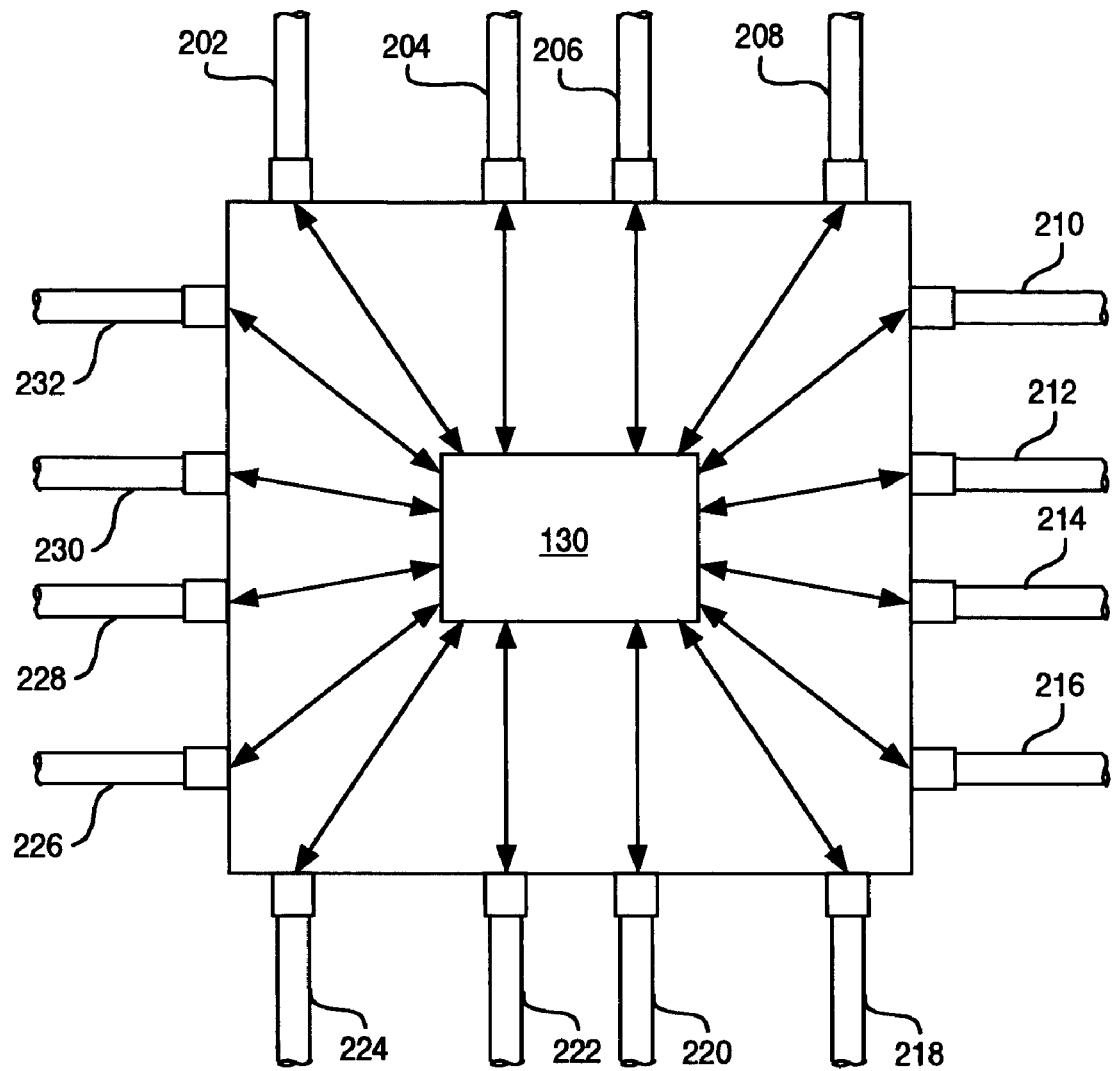
FIG. 2 is a block diagram of a computer system that contains a processor capable of processing data according to embodiments of the present invention.

Referring now to FIG. 1 and FIG. 2. FIG. 2 shows a block diagram of a computer system 200 comprising a plurality of communications links (202-232), and a processor 130 capable of executing a process to determine a number of non-power of two sized data packets required to transport a data block, according to embodiments of the present invention. This is the same processor 130 as shown in FIG. 1, with the same internal workings. In some embodiments, the processor is comprised of an Application Specific Integrated Circuit (ASIC). In the computer system 200, the plurality of communications links (202-232) are connected to the processor 130 inside the computer system 200. The computer system 200 and processor 130, shown in FIG. 2, can have more or less communications links, and they can be to external or internal sources and destinations. The processor 130 can also be used in many other embodiments, such as media centers, stereo systems, or any system that moves data blocks by packaging the data blocks into smaller packets.

The processor 130 in FIG. 2 receives data blocks over the communication link 110, then divides these data blocks into data packets for transport. The packets are sent to different areas within the processor 130, to different devices and applications within the computer 120, and outside the computer 120 to other devices, applications, and computers.

Figure 3:
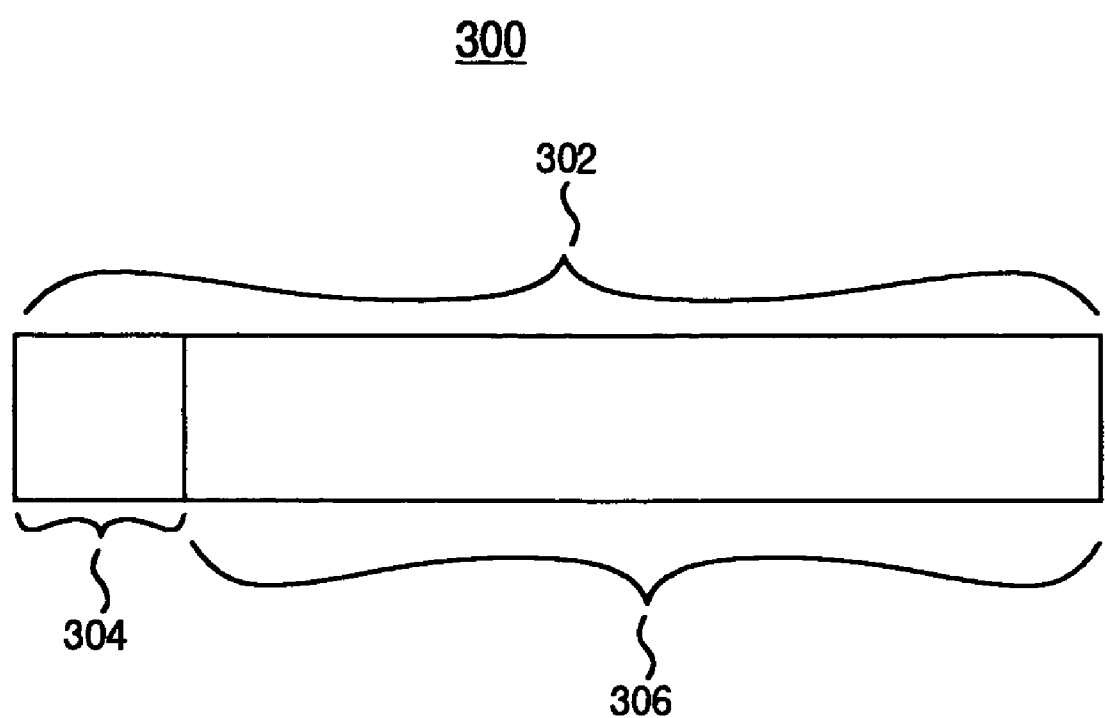
FIG. 3 is a block diagram showing the composition of a data packet in accordance with embodiments of the present invention.

With reference now to FIG. 1 and FIG. 3, as the processor 130, breaks a data block into packets, it needs to determine how many packets to break the block into. At this point, a high level overview of data packet composition is helpful. In one embodiment, shown in FIG. 3, the processor 130 transports data in a packet 300 that is a power of two number of bytes in width 302, for instance sixty-four bytes in width 302. In other embodiments, the width 302 of the packet 300 can be greater or smaller, depending on the capabilities of the transport system, sending and receiving devices, and applications involved. The packet 300 has a number of bytes, for instance two bytes, which are considered overhead 304 and are not actually a portion of the data block that has been packetized for transport 306. In other embodiments, this overhead 304 portion of the data packet can be bigger or smaller, depending on the specifics of the transport system and the sending and receiving devices involved. Using the example embodiment of a sixty-four byte packet width 302 with two bytes of overhead 304, sixty-two bytes of actual data 306 from the large data block would be included within the packet. This example packet composition will be used repeatedly to explain embodiments of this invention. However, it should be realized that, except where noted, the amount of non-overhead data 306 in the embodiments can be larger or smaller, depending on the overall packet width 302 and the amount of overhead data 304 included in the packet.

Referring to FIG. 1 and to FIG. 3. In an embodiment with sixty-two bytes of non-overhead data 306, the processor 130 needs to determine how many packets 300, containing a maximum of sixty-two bytes of the data 306 from the data block, will be needed to transport all of the data from the data block. To do this, the processor 130 executes a process to determine a number of non-power of two sized data packets 302 required to transport a data block, in accordance with embodiments of the present invention. The number of bytes in length of the data block 302 is used as a starting point for the process. Several embodiments of the process, that the processor 130 is capable of executing, are described in detail below in the descriptions of FIG. 4, FIG. 5, and FIG. 6.

Figure 4:
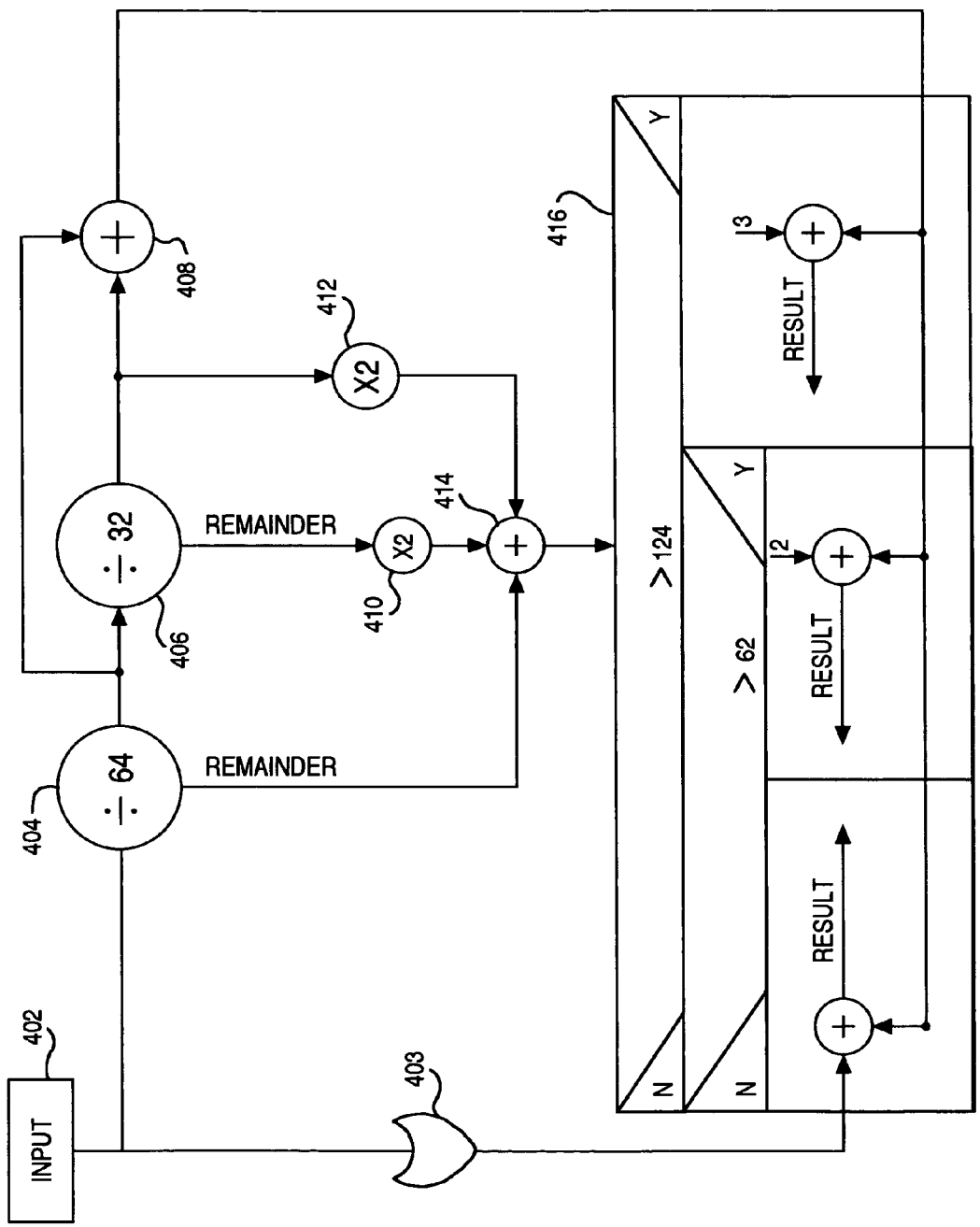
FIG. 4 is a data flow diagram of a method of determining how many sixty-two byte packets will be needed to transport a data block, in accordance with one embodiment of the present invention.

With reference now to FIG. 4, a data flow diagram 400 of a method of determining how many sixty-two byte packets will be needed to transport a data block, in accordance with one embodiment of the present invention is shown. Though the entire diagram 400 is geared toward one embodiment, namely division of a data block into packets of sixty-two bytes through the use of a sixty-four byte divisor, the individual parts of the method are useful in other embodiments.

In the FIG. 4, block 402 is the starting point where a data block length enters the process. The data block length is then routed to the OR gate in block 403, and a divider in block 404.

In block 404, the data block length is divided by sixty-four, to get the first approximation of the correct number of sixty-two byte data blocks. The quotient is sent on to block 406 for further division and to block 408 for summing. In some embodiments, this partial result is called the first value. This partial result will be summed later on with other partial results. The remainder from block 404 is sent to block 414 for summing. This remainder is known in some embodiments as the second value. It is important to note that the data block length is divided by sixty-four to get an approximate result of what would happen if the data block length were divided by sixty-two. A divisor of sixty-four is utilized because it is the next power of two larger than sixty-two. Dividing by a power of two is important, because it takes virtually no overhead to accomplish as compared to dividing by a non-power of two. One can think of it as a bit shifting operation that is the binary equivalent of moving a decimal point from one position to another in base-ten arithmetic.

In block 406, the quotient from block 404 gets divided again, this time by thirty-two. This is another low overhead operation. Essentially, it is a bit shifting operation that is equivalent to moving a decimal point in base-ten arithmetic. The remainder from block 406 is sent to block 410. The quotient, in some embodiments referred to as the third value, is sent to block 408 and block 412. This quotient, or third value represents a partial result that will be summed later on with other partial results.

In block 408, the quotients from block 404 and block 406 are summed and sent to block 416, a priority encoder. The two values that are summed are both partial results. They will be summed again with another partial result within the priority encoder. In some embodiments, this summing of partial results is done in stages, while in others it is done all at once. In some embodiments, the summing is done inside the priority encoder, while in other embodiments it is done outside the priority encoder. The outcome is the same regardless.

In block 410, the remainder from block 406 is multiplied by two to convert it into the proper units to be summed with the other numbers in block 414. This is a leftward binary shifting operation.

In block 412, the quotient from block 406 is multiplied by two to convert it into the proper units to be summed with the other numbers in block 414. This is a leftward binary shifting operation.

In block 414, the converted remainder from block 406 and the converted quotient from block 406 are summed; this creates what is called a fourth value in some embodiments. This fourth value is also summed with the remainder from block 404, or second value. The result, called a fifth value in some embodiments, is sent into block 416 to undergo comparisons to predetermined values. The summation that occurs in block 414 can be done in stages or all at once as shown in FIG. 4. For clarity of illustration, the conversion steps of block 410 and 412 were separated from block 414. In some embodiments, a single conversion step could be used or even combined with block 414. In some embodiments, the remainder and quotient from block 406 can be summed then sent on for conversion and summing at block 414. These embodiments simply constitute a slight shifting of the order of the steps.

Block 416 is a representation of a priority encoder. The priority encoder compares the fifth value from block 414 to predetermined numbers, makes decisions based on the results of the comparisons, and calculates values. In some embodiments, the values calculated during this analysis are called the sixth and seventh value, wherein the sixth value is a partial result and the seventh value is a remainder. In some embodiments the priority encoder can do the final summation, while in others, it can simply calculate the last partial result and remainder, leaving the summation for a later step.

In block 416, the first predetermined number that the value from block 414 is compared to is one hundred twenty-four. If the value is larger, then no more comparisons need be made, as it is known that there are two full sixty-two-byte packets and a remainder. The two packets comprise a partial result known in some embodiments as the sixth value. The remainder is known as the seventh value in some embodiments. The two packets and the remainder are added together with the value from block 408 by summing the value from block 408 with the number three, to get a final result.

If the value from block 414 is found to be smaller than one hundred twenty-four, a second comparison is made to the number sixty-two. If the value is found to be larger than sixty-two, then it is known that there is one full sixty-two byte packet and a remainder. The one packet comprises a partial result known in some embodiments as the sixth value. The remainder is known as the seventh value in some embodiments. The one packet and the remainder are added together with the value from block 408 by summing the value from block 408 with the number two, to get a final result.

The length value of the data block is sent to block 403, where a portion of the value undergoes a logical OR operation. The result is then fed into Block 416.

Referring again to block 416. If the value of the remainder (seventh value) is less than sixty-two, then it is known that there are zero full sixty-two byte data packets (sixth value=zero) and a remainder of some size less than sixty-two bytes. The sum of the quotients from block 414 is summed with the result of block 403, to get the final result. This is equivalent to adding one if the original length of the data block was longer than sixty-two bytes, or adding zero if the length of the data block was less than or equal to sixty-two bytes. In other embodiments, this portion of block 416 could be accomplished differently by simply adding an additional comparison or conditional addition step to the priority encoder or after the priority encoder.

Figure 5:
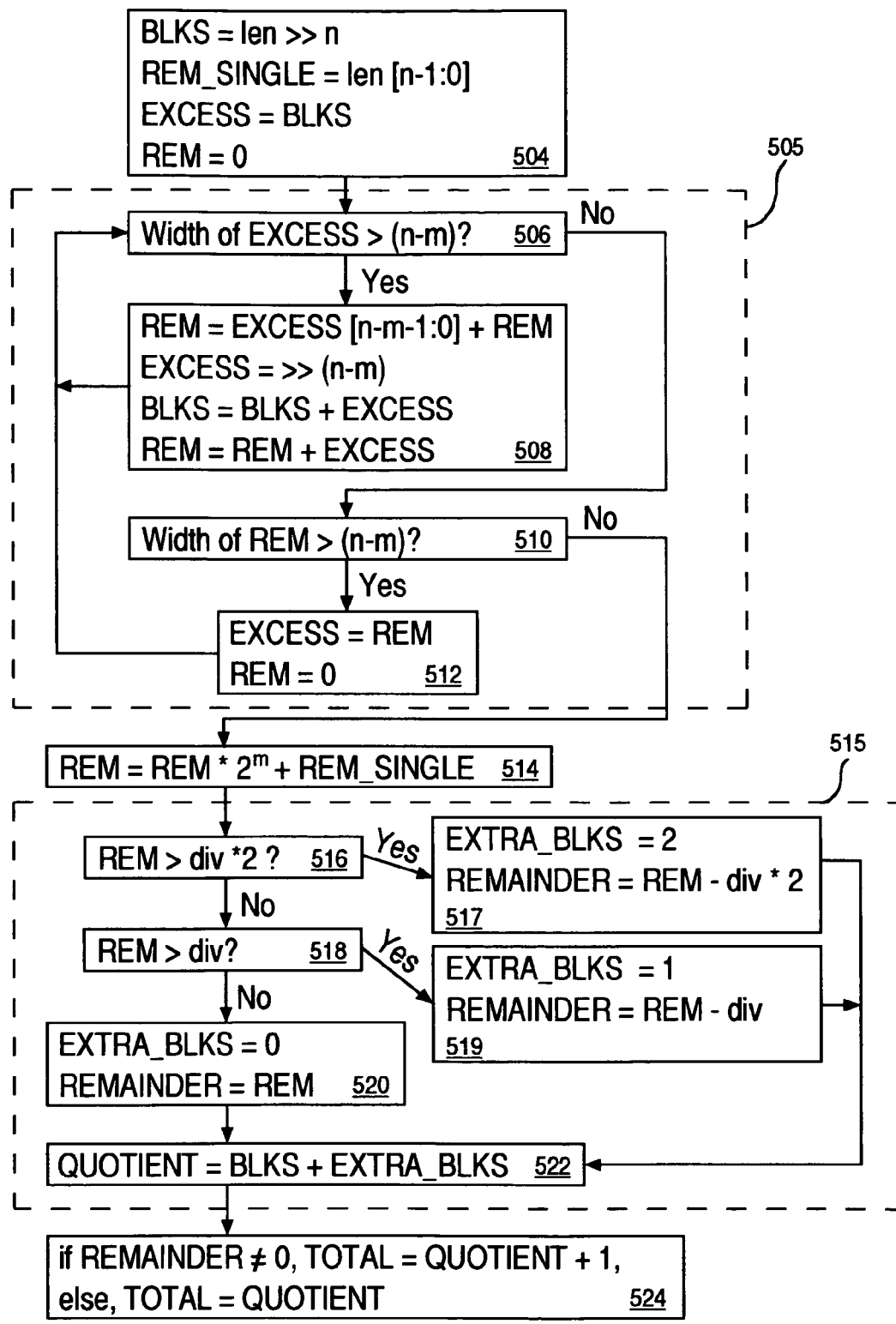
FIG. 5 is a pseudo code flow diagram of a method of determining how many non-power of two sized data packets will be needed to transport a data block in accordance with embodiments of the present invention.

With reference now to FIG. 5, a pseudo code flow diagram of a method of determining how many non-power of two sized data packets will be needed to transport a data block in accordance with embodiments of the present invention is shown. The method utilizes an approximate divisor larger than the size of the non-power of two sized, non-overhead portion of the packet to perform calculations. The method shown in FIG. 5 works for embodiments where the approximate divisor [adiv] is a power of two in size, and is also larger than the non-overhead portion of the data packet [div] by a power of two. For example, this embodiment would work with an approximate divisor of sixty-four bytes ($2^6$) and a non-overhead portion of a data packet of sixty-two bytes. The difference between the two sizes is two bytes ($2^1$), a power of two. The process is flexible and will work with other larger or smaller data packet sizes that comply with the rules of the process. For instance, an approximate divisor of one hundred twenty-eight ($2^7$) could be used with a non-overhead packet size of one hundred twenty, which is less than one hundred twenty-eight by eight bytes ($2^3$).

In FIG. 5, the "len" variable is the dividend. The "div" variable is the desired divisor (i.e. non-overhead portion of the data packet). The "adiv" variable is the approximate divisor, and is the form of: [adiv=$2^n$, where n=2, 3, 4 . . . ]. This method relies on the relationship: [adiv–div=$2^m$, where m=0, 1, 2 . . . ].

In block 504, the process begins with the byte length of the data block to be divided stored in the BLKS variable. This is then right shifted by [n] bytes. This right shifted value is a partial result known as the first value in some embodiments. The excess, or remainder, that was shifted rightward and off of BLKS is store in REM_SINGLE. In some embodiments, this is called the second value. EXCESS, a temporary binary variable, is set equal to BLKS. Finally, REM is initialized to zero.

In block 506, the width of EXCESS is compared to (n–m) as the starting argument for a nested set of loops. If it is greater, continued processing will take place in block 508 of the inner loop, if less, the inner loop is skipped and the method proceeds to block 510 to test the starting argument for the outer loop of the nested loops. This is the starting argument for a loop 505 that will calculate a partial result, called the third value in some embodiments. This loop 505 will also calculate, what is known as the fourth value in some embodiments.

In block 508, the REM variable is primed with the function: REM=EXCESS [n–m–1:0]+REM. The EXCESS variable is then rightward shifted by [n] bits. The result after the rightward shifting is a partial result called the third value in some embodiments. BLKS is set equal to [BLKS+EXCESS]. This is equivalent to summing the first value with the third value. This sum of partial values will be summed with another partial value later in the process. REM is primed again, this time by the function: REM=REM+EXCESS. The process then proceeds back to block 506 for another comparison to see if the loop to block 508 will be repeated, or the process will move on to block 510. This loop is repeated until the bit width of the EXCESS variable is less than or equal to (n–m).

Block 510 tests for an entering argument for the second half of the nested loop structure 505. The REM variable undergoes a comparison. This loop is repeated until the width of REM is less than or equal to (n–m). If this comparison is true, the process proceeds to block 512 and the second, or outer loop of the nested loop structure 505. If this comparison is false, the process proceeds to block 514, a summing block just before the priority encoder 515. As the loop structure 505 is exited, the value last stored in the REM variable becomes what is known in some embodiments as the fourth value.

In block 512 the EXCESS variable is set equal to REM, and then REM is initialized at zero. The process then proceeds back to block 506 to evaluate the entering argument for the nested looping structure 505 again. The nested loop 505 continues to operate until the comparison in block 510 yields a false value. As the loop structure 505 is exited, the value last stored in the REM variable becomes what is known in some embodiments as the fourth value.

Referring now to block 514. The REM variable is initialized with a new value by the line: REM=REM*$2^m$+REM_SINGLE. This step converts the fourth value to the same units as the first value, and then sums them. This is in effect the summing of the partial remainders generated thus far in the process. The result that is left in the REM variable is known in some embodiments as the fifth value. The value in the REM variable is now sent to the priority encoder where it will undergo one or more comparisons in order to discern other values.

Block 515 constitutes a plurality of blocks, which together comprise the function of a priority encoder. Block 515 takes as inputs, the values generated in earlier process steps. Through a series of comparisons block 515 generates another partial result and remainder that will need to be summed with the previous partial results from block 505 to get a final result. In some embodiments, the final summing can be done inside the priority encoder, in some embodiments the final summing is done outside the priority encoder.

In block 516 the REM variable undergoes a comparison in the line: [REM>div*2?]. If the result of the comparison is true, the process proceeds to block 517, and it is known that the REM variable is currently more than twice the size of [div], which represents the non-overhead portion of a data packet. If the result of the comparison is false, the process proceeds to block 518.

In block 517 the variable EXTRA_BLKS is set equal to two, and represents a partial result that is called the sixth value in some embodiments. The variable REMAINDER is set equal to [REM–div*2], and represents a remainder that is referred to as the seventh value in some embodiments. The process then proceeds to block 522 for a summing of the partial results.

In block 518 the REM value undergoes another comparison with the conditional statement: [REM>div*2?]. If the result of the comparison is true, the process proceeds to block 519, and it is known that the REM variable is currently larger than the size of [div], which represents the non-overhead portion of a data packet. If the result of the comparison is false, the process proceeds to block 520.

In block 519 the variable EXTRA_BLKS is set equal to one, and represents a partial result that is called the sixth value in some embodiments. The variable REMAINDER is set equal to [REM–div], and represents a remainder that is referred to as the seventh value in some embodiments. The process then proceeds to block 522 for a summing of the partial results.

In block 520 the EXTRA_BLKS variable is set equal to zero, and represents a partial result that is referred to as the sixth value in some embodiments. The REMAINDER variable is set equal to REM, and represents a remainder that is referred to as the seventh value in some embodiments. The process then proceeds to block 522 for a summing of the partial results.

In block 522 the partial results are summed to find a quotient with the line: QUOTIENT=BLKS+EXTRA_BLKS. This is a summation of three partial results (first value+third value+sixth value), since BLKS was previously summed with EXCESS in block 508. At the conclusion of block 522, the process illustrated in FIG. 5 has determined the number of packets, along with the number of remainder bytes left over, after a data block length is packetized.

In block 524 a total number of packets is calculated by the conditional functions. Any amount of remainder bytes greater than zero will require another packet to transport them. Therefore, a final calculation of adding one to the quotient if the remainder is greater than zero, gives the total number of non-power of two packets of size [div] needed to transport the data block that the process was performed on. If there is a remainder, [TOTAL=QUOTIENT+1] calculates the total number of packets needed to transport the data block. Else, when there is no remainder, [TOTAL=QUOTIENT] calculates the total number of packets needed to transport the data block. In some embodiments, the priority encoder can compensate for the presence of a remainder by adding an extra packet to the partial result that it calculates, thus eliminating the requirement for block 524.

Figure 6:
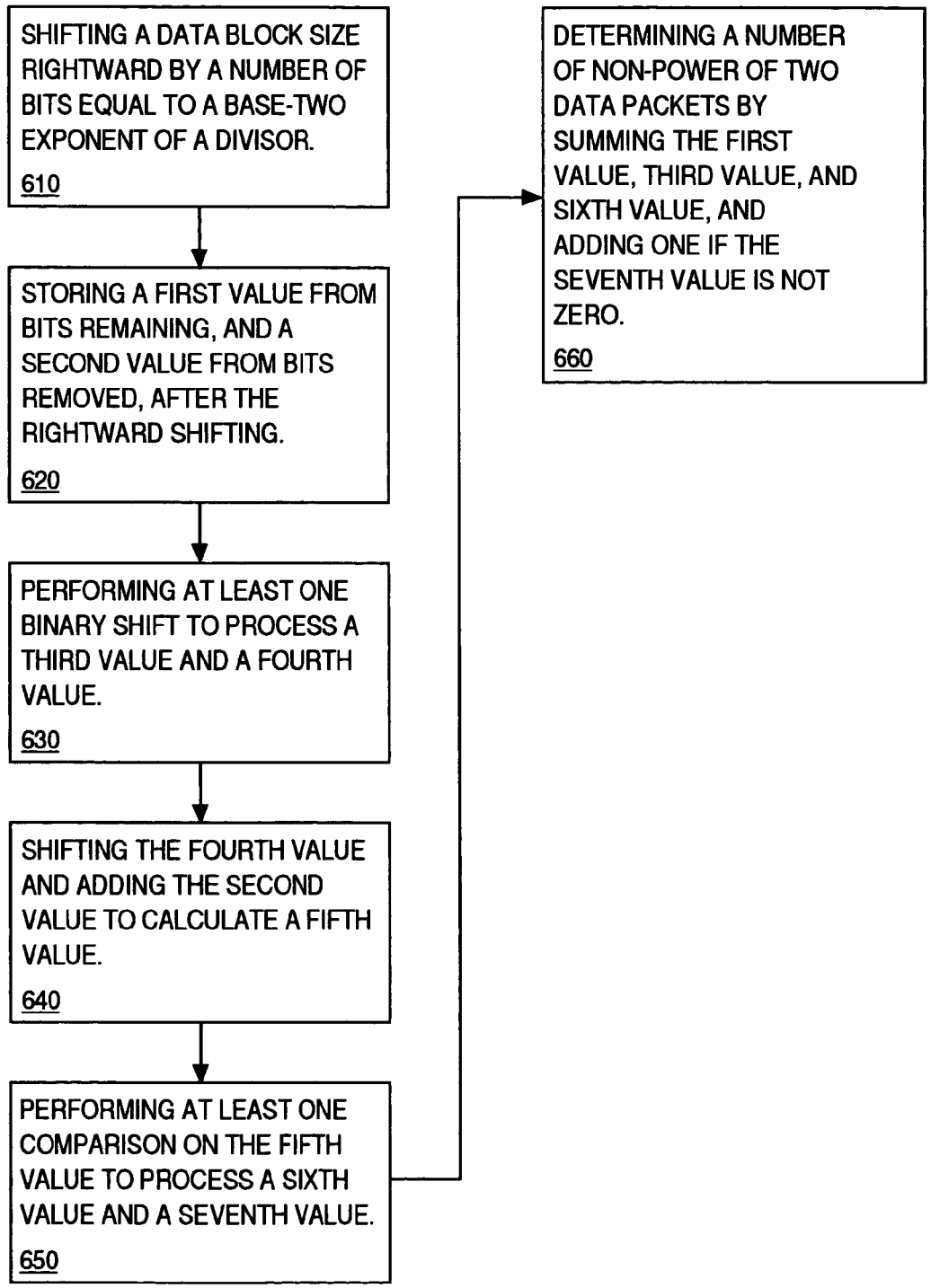
FIG. 6 is a flowchart of a method of determining how many non-power of two sized data packets will be needed to transport a data block in accordance with embodiments of the present invention.

With reference now to FIG. 6, a flowchart 600 of a method of determining how many non-power of two sized data packets will be needed to transport a data block in accordance with one embodiment of the present invention is shown.

Block 610 provides for shifting a data block rightward by a number of bits equal to a base-two exponent of a divisor. In one embodiment, the divisor is greater than the non-power of two sized data packet by a power of two. The number of bytes in length of the data block is used as a starting point. Assuming for example, a data block two thousand three hundred bytes in length, the binary equivalent of the number two thousand three hundred [100011111100] is binary shifted rightward by a number of bit shifts equal to a base-two exponent of a power of two-sized divisor.

For example, in an embodiment with a sixty-two byte non-overhead portion of data in each packet, a divisor of sixty-four can be used to approximate the act of dividing by sixty-two. Choosing a slightly larger divisor that is a power of two makes the division easy. This method works with a divisor that is a power of two, and is also a power of two larger than the actual divisor. Because the divisor being used is a power of two, namely $2^6$, division can be accomplished by simply shifting the figure representing the number of bytes in the data block rightward by six bits. A right shift, in binary manipulation, causes data shifted rightward of the decimal point to be truncated, or removed from the working number. In other embodiments of the present invention, the data block length is rightward shifted by more or less bit shifts, depending on the exponent of the power of two sized divisor packet that is chosen.

Block 620 provides for storing a first value from the bits remaining, and a second value from bits removed, after the rightward shifting. The number of bits of the data block length that remain after the rightward shift are stored as a first value. Using the example embodiment from block 610, thirty-five [100011] would be saved as a first value and sixty [111100] would be stored as the second value. The first value represents a partial number of non-power of two sized packets that will be needed to transport the block of data. In the example embodiment being used, this is a partial number of sixty-two byte packets that will be needed to transport the data block. Other embodiments would contain larger or smaller non-power of two data packets, depending on the overhead/non-overhead composition of the final data packet used for transporting. The second value represents an amount left over after the division done by rightward shifting the data block. The first value and the second value are stored for use in follow-on computations.

Block 630 provides for performing at least one binary shift to process a third and fourth value.

Still referring to block 630. In one embodiment, the third and fourth values are processed by using a looping comparator with a starting argument based on a comparison to a width in bits of the first value. In one embodiment, the width in bits of the first value is saved as a variable, and the base two exponent of the divisor packet is saved as a first constant. In an embodiment following the example from block 610 with a sixty-four byte ($2^6$) divisor, the first constant would equal six. In one embodiment, the difference between the divisor and the non-power of two data packet size is saved as a second constant. In the example embodiment, the approximate divisor is sixty-four bytes, and the non-power of two data packet size is sixty-two bytes. In the example embodiment, the difference is two, or $2^1$, so one is saved as the second constant. A difference between the first and second constants is calculated. In the example embodiment, six minus one gives a difference of five. This difference between the constants is compared to the width in bits of the first value, as the entering argument for the looping comparator. Because the width (six) is greater than the difference between the constants (five), the loop is entered, calculations are performed, and the variable stored from the first value is divided by rightward shifting it by the difference. This portion of the method for calculating a plurality of partial results and a remainder from the first and second values works in embodiments where the power of two sized divisor is greater than the non-power of two sized data packet by a power of two. Other embodiments using different data block sizes, divisor sizes, and non-power of two data packet sizes are possible, and will yield different results than the example embodiment that is described.

Referring again to block 630. In one embodiment the third and fourth values are processed by shifting the first value rightward by a number of binary shifts equal to one less than a power of two exponent of the divisor; storing as the third value a number of bits that remain after the rightward shift of the first value; and storing as the fourth value a sum of the third value and a number of bits removed by said rightward shift of the first value. In the example embodiment from blocks 610 and 620, where the size of the divisor is sixty-four bytes, or $2^6$, six minus one yields a total of five rightward bit shifts. This rightward shifting is the same as dividing by half of sixty-four, or thirty-two. A third value is stored from the bits that remain after the rightward shift of the first value. A fourth value is stored from the sum of the third value and the value of the bits that were removed from the first value by the rightward shifting. This embodiment works only with a divisor size of sixty-four bytes and a non-power of two data packet size of sixty-two bytes, as is the case with the example embodiment that is being followed. This embodiment is useful where a system transports data in sixty-four byte packets comprising two bytes of overhead and sixty-two bytes of actual data.

Block 640 provides for shifting the fourth value and adding the second value to calculate a fifth value. One embodiment also provides for determining the difference between the divisor and the non-power of two sized data packet, and shifting fourth value leftward by a number of binary shifts equal to the difference. The shifted fourth value is added to the second value to calculate a fifth value. In some embodiments, this is all that is needed to calculate the fifth value, in other embodiments extra calculations are needed to arrive at the complete fifth value. In some embodiments, the shifting can be done prior to block 640 and the fourth value and second value will just be added to calculate the fifth value—such an embodiment would merely be a slight shuffling in the order of the steps.

Block 650 provides for performing at least one comparison on the fifth value to process a sixth and seventh value. In some embodiments at least one comparison is done on the fifth value utilizing a priority encoder to process a sixth and a seventh value. In some embodiments, the priority encoder used is a three to one priority encoder. In some embodiments, the comparisons are made to pre-determined numbers. In some embodiments, the comparisons are made to numbers that are calculated from size of the non-power of two sized data packet. In some embodiments, the sixth value is referred to as a partial result and the seventh value is referred to as a remainder, and a priority encoder is used to process the remainder and this partial result. In some embodiments, at least one comparison is done with a conditional looping structure to process a sixth and seventh value from the fifth value. The comparisons performed in this block are useful, because they avoid the extra clock cycles needed to do additional arithmetic.

Block 660 provides for determining a number of non-power of two data packets by summing the first value, third value, sixth value, and adding one if the seventh value is not zero. The first value, third value, and sixth value are all partial results, and the seventh value is a remainder. So an equivalent way of describing this calculation in some embodiments is by saying that, the partial results are summed, and one is added if the remainder is greater than zero. In some embodiments, the partial results are summed all at once. In other embodiments, some of the partial results are summed earlier in the process, with the result carried forward for the final summation of the partial results. The sum of the partial results gives a quotient to the calculation that was performed. This quotient is the number of full non-power of two sized packets that will be needed. However, if a remainder exists, it will also require one packet for its transmission. This is why one is added to the sum of the partial results in the case where the remainder is not zero. Some embodiments figure the remainder in with one of the partial results, while other embodiments calculate the remainder separately.

Although specific steps are disclosed in flowchart 600, such steps are exemplary. That is, embodiments of the present invention are well suited to performing various other (additional) steps or variations of the steps recited in flowchart 600. It is appreciated that the steps in flowchart 600 may be performed in an order different than presented, and that not all of the steps in flowchart 600 may be performed. In one embodiment, flowchart 600 is implemented as computer-readable program executed by processor 130 (see FIGS. 1 and 2) in computer system 100 (FIG. 1) or computer system 200 (FIG. 2).

In summary, embodiments of the present invention provide methods and systems for determining a number of data packets required to transport a data block. These methods and systems facilitate improved speed, and the ability to meet circuit timing requirements in high-speed devices and systems that transport data.

Embodiments of the present invention are thus described. While the present invention has been described in particular embodiments, it should be appreciated that the present invention should not be construed as limited by such embodiments, but rather construed according to the following claims.

What is claimed is:

1. A process to determine a number of data packets required to transport a data block, wherein said data packets comprise a non-power of two number of bytes, said process comprising:

shifting a binary equivalent of a decimal size of the data block rightward by a number of bits equal to an exponent of a decimal divisor as a power of two, wherein the decimal divisor is equal to a next power of two larger than the decimal size of the data packets;

storing bits remaining from the rightward shifting of the block size as a first value, and storing bits removed by the rightward shifting of the block size as a second value;

shifting the first value rightward by a number of bits equal to one less than the exponent of the decimal divisor as the power of two;

storing bits remaining from the rightward shifting of the first value as a third value and storing a sum of the third value and bits removed by the rightward shifting of the first value as a fourth value;

shifting the fourth value and adding the second value to calculate a fifth value;

performing at least one comparison on the fifth value to process a sixth value and a seventh value; and determining the number of data packets required to transport the data block by summing the first value, third value, and sixth value, and adding one if the seventh value is not zero.

2. The process as recited in claim 1, wherein the divisor is greater than the non-power of two sized data packet by a power of two.

3. The process as recited in claim 1, wherein the non-power of two data packets each comprise sixty-two bytes and the divisor comprises sixty-four bytes.

4. The process of claim 1, wherein the process includes processing a third value and fourth value including:

using a looping comparator; and providing a starting argument for said looping comparator based on a comparison to a width in bits of the first value.

5. The process of claim 1, wherein said shifting the fourth value and adding the second value to calculate a fifth value further comprises:

determining a difference between the divisor and the non-power of two sized data packet; and shifting the fourth value leftward by a number of binary shifts equal to said difference.

6. The process as recited in claim 1, wherein said performing at least one comparison on the fifth value to process a sixth value and a seventh value further comprises: utilizing a priority encoder.

7. A computer-readable medium having computer executable instructions that, when executed, perform a process to determine a number of non-power of two sized data packets required to transport a data block, said process comprising:

shifting a binary equivalent of a decimal size of the data block rightward by a number of bits equal to an exponent of a decimal divisor as a power of two, wherein the decimal divisor is equal to a next power of two larger than the decimal size of the data packets;

storing bits remaining from the rightward shifting of the block size as a first value, and storing bits removed by the rightward shifting of the block size as a second value;

shifting the first value rightward by a number of bits equal to one less than the exponent of the decimal divisor as the power of two;

storing bits remaining from the rightward shifting of the first value as a third value and storing a sum of the third value and bits removed by the rightward shifting of the first value as a fourth value;

shifting the fourth value and adding the second value to calculate a fifth value;

performing at least one comparison on the fifth value to process a sixth value and a seventh value; and determining the number of data packets required to transport the data block by summing the first value, third value, and sixth value, and adding one if the seventh value is not zero.

8. The process as recited in claim 7, wherein the divisor is greater than the non-power of two sized data packet by a power of two.

9. The process as recited in claim 7, wherein the non-power of two data packets each comprise sixty-two bytes and the divisor comprises sixty-four bytes.

10. The process of claim 7, wherein the process includes processing a third value and fourth value including:
   using a looping comparator; and
   providing a starting argument for said looping comparator based on a comparison to a width in bits of the first value.

11. The process of claim 7, wherein said shifting the fourth value and adding the second value to calculate a fifth value further comprises:
   determining a difference between the divisor and the non-power of two sized data packet; and
   shifting the fourth value leftward by a number of binary shifts equal to said difference.

12. The process as recited in claim 7, wherein said processing a sixth value and a seventh value from said fifth value through a plurality of comparisons comprises: utilizing a priority encoder.

13. A computer system comprising:
   a communications link;
   a processor coupled to the communications link, said processor capable of executing a process to determine a number of non-power of two sized data packets required to transport a data block;
   a shifter coupled to said processor, said shifter to:
      shift a binary equivalent of a decimal size of a data block rightward by a number of bits equal to an exponent of a decimal devisor as a power of two, wherein the decimal devisor is equal to a next power of two larger than a decimal size of the data packets;
      shift a first value rightward by a number of bits equal to one less than the exponent of the decimal divisor as the power of two, wherein the first value comprises bits remaining from the rightward shift of the block size; and
      shift a fourth value;
   a memory coupled to said shifter, said memory to:
      store the first value, and bits removed by the rightward shifting as a second value; and
      store bits remaining from the rightward shift of the first value as a third value and store a sum of the third value and bits removed by the rightward shift of the first value as the fourth value;
   an adder coupled to said logic to:
      add the second value to the shifted fourth value to calculate a fifth value; and
      add the first value, the third value, and a sixth value and adding one if a seventh value is not zero; and
   logic coupled to said memory and to said adder, said logic to:
      perform at least one comparison on the fifth value to process the sixth value and the seventh value; and
      determine the number of data packets required to transport the data block according to the sum of the first value, third value, and sixth value and the addition of one if the seventh value is not zero.

14. The computer system of claim 13, wherein said processor comprises:
   an Application Specific Integrated Circuit (ASIC).

15. The computer system of claim 13, further comprising:
   a plurality of communications links, wherein said processor is coupled to the plurality of communications links.

16. The process of claim 13, wherein the non-power of two data packets each comprise sixty-two bytes.

17. The process of claim 13, wherein said shifter to shift a data block size by a number of bits further comprises:
   a shifter to shift a data block size by a number of bits equal to a base-two exponent of a divisor, wherein the divisor is greater than the non-power of two sized data packet by a power of two.

18. The process of claim 13, wherein said logic further comprises:
   logic to compute the third value and the fourth value from said first value with a looping comparator.

19. The process of claim 13, wherein said logic further comprises:
   logic to compute the remainder and the sixth value with a priority encoder.

* * * * *

UNITED STATES PATENT AND TRADEMARK OFFICE
CERTIFICATE OF CORRECTION

| | | |
|---|---|---|
| PATENT NO. | : 7,839,936 B2 | Page 1 of 1 |
| APPLICATION NO. | : 11/123483 | |
| DATED | : November 23, 2010 | |
| INVENTOR(S) | : Michael Vacanti | |

It is certified that error appears in the above-identified patent and that said Letters Patent is hereby corrected as shown below:

In column 13, line 29, in Claim 13, delete "devisor" and insert -- divisor --, therefor.

In column 13, line 30, in Claim 13, delete "devisor" and insert -- divisor --, therefor.

Signed and Sealed this
First Day of November, 2011

David J. Kappos
*Director of the United States Patent and Trademark Office*